United States Patent [19]
Kollar

[11] 3,789,065
[45] Jan. 29, 1974

[54] PROCESS FOR PREPARING VICINAL GLYCOL ESTERS FROM OLEFINS

[75] Inventor: John Kollar, Wyckoff, N.J.

[73] Assignee: Halcon International, Inc., New York, N.Y.

[22] Filed: Oct. 7, 1971

[21] Appl. No.: 187,552

Related U.S. Application Data

[63] Continuation-in-part of Ser. No. 16,258, March 3, 1970, abandoned.

[52] U.S. Cl....... 210/497 R, 260/471 R, 260/473 S, 260/476 R, 260/478 U, 260/491
[51] Int. Cl... C07c 67/04, C07c 69/16, C07c 69/28
[58] Field of Search..... 260/497 R, 478, 410.6, 491, 260/476

[56] References Cited
UNITED STATES PATENTS

| | | | |
|---|---|---|---|
| 3,071,601 | 1/1963 | Aries | 260/497 R |
| 3,262,969 | 7/1966 | Clark et al. | 260/497 A |
| 3,479,395 | 11/1969 | Hugnet | 260/497 R |
| 3,542,857 | 11/1970 | Lutz | 260/497 R |
| 3,652,668 | 3/1972 | Bryce-Smith et al. | 260/497 R X |
| 3,176,039 | 3/1965 | Hay | 260/497 R X |
| 3,427,348 | 2/1969 | Olson | 260/497 R |
| 3,647,892 | 3/1972 | Hoch | 260/497 R X |

FOREIGN PATENTS OR APPLICATIONS

| | | | |
|---|---|---|---|
| 904,304 | 6/1962 | Great Britain | 260/537 X |
| 1,124,862 | 8/1968 | Great Britain | 260/497 R |
| 1,029,319 | 5/1966 | Great Britain | 260/497 A |

*Primary Examiner*—Lorraine A. Weinberger
*Assistant Examiner*—Richard D. Kelly
*Attorney, Agent, or Firm*—William C. Long et al.

[57] ABSTRACT

In the process for preparation of vicinal glycol esters from an olefin by reacting the olefin in the liquid phase with molecular oxygen and a carboxylic acid in the presence of a catalyst within an oxidation zone, selectivities to the desired glycol esters are improved by treating the high-boiling residue and the precursor light components separated from the oxidation effluent by contacting them with a carboxylic acid. In a preferred embodiment both residue and precursor light components are recycled to the oxidation zone where they are converted to additional glycol ester product.

13 Claims, No Drawings

PROCESS FOR PREPARING VICINAL GLYCOL ESTERS FROM OLEFINS

CROSS REFERENCES TO RELATED APPLICATIONS

This application is a continuation-in-part of co-pending application Ser. No. 16,258, filed Mar. 3, 1970 now abandoned.

Applications closely related to the present invention and describing the particular catalytic reactions for producing glycol esters are co-pending applications, Ser. No. 763,001, filed Sept. 26, 1968 now abandoned and Ser. No. 762,978, also filed Sept. 16, 1968.

BACKGROUND OF THE INVENTION

The co-pending applications filed on Sept. 26, 1968 disclose catalytic systems of great value in the production of vicinal glycol esters from olefins by oxidation techniques. This invention teaches methods for obtaining even better yields which methods are particularly appropriate for use in continuous operations on a commercial scale.

Vicinal glycol esters are particularly useful organic chemical intermediates and extractive solvents. The glycol esters obtained from lower olefins, such as ethylene, are useful in the production of ethylene glycol, a chemical of enormous commercial importance. Ethylene glycol can be prepared by the hydrolysis of the ethylene glycol carboxylic acid esters as disclosed in co-pending application, Ser. No. 819,507, filed Mar. 14, 1969. Similarly, propylene glycol can be prepared by the hydrolysis of 1,2-propylene glycol carboxylic acid esters.

Therefore, it is an object of the present invention to develop a process whereby glycol carboxylic acid esters can be produced at selectivities improved over those heretofore obtained.

It is also an object of the present invention to develop a process whereby the glycol carboxylic acid esters can be prepared in a continuous fashion at improved selectivities.

SUMMARY OF THE INVENTION

In accordance with the present invention, it has been discovered that when vicinal glycol esters are obtained by the catalytic reaction of (i) an olefin, (ii) molecular oxygen and (iii) a carboxylic acid corresponding to the acyl moiety of the ester products, the liquid effluent from the oxidation zone contains a significant amount of high-boiling "residue" and "precursor light components" produced during the oxidation reaction.

The high-boiling residue present in the effluent from the oxidation zone includes ether-alcohol-type materials similar to those formed when oxirane compounds (e.g., ethylene oxide) are subjected to thermal hydration and, assuming ethylene to have been the olefin oxidized, would include analogues (including esterified and/or halogenated derivatives) of di-ethylene glycol and tri-ethylene glycol. I have surprisingly found that these high-boiling materials, when separated from the liquid reaction medium, can then be treated by contact in the liquid phase with a carboxylic acid-containing medium to yield additional amounts of the desired esters. Furthermore, I have discovered that the precursor light components separated from the glycol esters can in like fashion also be treated by contact of the precursor light components in the liquid phase with a carboxylic acid-containing medium to obtain yet further amounts of the desired esters.

That these materials can effectively be subjected to what appears to be a re-equilibration reaction by the process of this invention is indeed surprising. In the analogous thermal hydration of oxirane compounds to form the corresponding glycols, re-equilibration does not readily occur, and the materials converted to higher glycols (i.e., glycol ethers such as di- and tri-ethylene glycol) represent a yield loss. Treatment of higher glycols with carboxylic acids does not result in re-equilibration and gives no significant yield improvement. The novel and wholly unexpected advantages achieved by the process of this invention therefore appear to be due to fundamental differences in the characteristics of the materials treated, which in turn appear to be due to the process whereby these materials are prepared.

Since, in the process of this invention, the liquid phase reaction medium within the oxidation zone includes carboxylic acid and since the termperature and pressure conditions for the contacting of the high-boiling residue and/or the precursor light components with the carboxylic acid-containing medium are similar to those of the catalytic reaction itself, the treatment is effectively conducted by recycle of this residue and/or precursor light components to the reaction zone. Such a recycle technique is a preferred embodiment of this invention.

By operating in accordance with my invention, I am able to improve oxidation selectivities to the desired glycol ester and especially to the glycol diester. This improved selectivity is of great value in commercial scale operations and in view of the situation prevailing in otherwise seemingly analogous technology, is wholly unexpected.

The catalyst employed in the liquid phase reaction consists essentially of (i) a variable valent metal cation in conjunction with (ii) an appropriate halogen source. The halogen source is selected from the group consisting of at least one of bromine, chlorine, a bromine-containing compound and a chlorine-containing compound. The variable valent metal cation is selected from the group consisting of at least one of tellurium, cerium, antimony, manganese, vanadium, gallium, arsenic, cobalt, copper, selenium, chromium and silver.

DETAILED DESCRIPTION OF THE INVENTION

The following terms used in this specification and in the appended claims are defined as follows:

"Vicinal glycol esters" (also referred to as "glycol ester" or simply as "product") — aliphatic vicinal glycol esters, the glycol moiety of which has a carbon structure corresponding to the olefinic reactant but with a lesser degree of unsaturation (i.e., more nearly saturated) and with the ester moiety or moieties corresponding in structure to the carboxylic acid reactant or reactants. The term as herein used encompasses the diester as well as the mono-ester. For further convenience, the small quantity of free (i.e., not esterified) glycol formed is included within the term "ester product" because it, like the di- and mono-esters, is of great value and generally is present in so small a quantity (less than 20 percent, mole basis) in relation to the totality of diester, monoester plus free glycol as not to significantly affect the ester character of the product. Thus, when dealing with ethylene and acetic acid as reactants, the glycol ester consists of ethylene glycol diacetate (i.e., 1,2-diacetoxy ethane), ethylene glycol monoacetate and ethylene glycol itself. Similarly, in the case of propylene, the desired glycol ester product includes propylene glycol diester, propylene glycol monoester and propylene glycol.

Residue — The material present in the effluent from the oxidation zone which boils at a temperature higher than that at which the diester component of the vicinal glycol ester product boils. The chemical character of the residue is not fully known and is difficult to elucidate but it is believed to include such materials (assuming ethylene to be the olefin) as diethylene and triethylene glycols, the bulk of which are probably present in partially esterified and halogenated forms. When propylene is the olefin, the residue includes such materials as dipropylene glycol, tripropylene glycol and their partially esterified and halogenated analogues.

Precursor Light Components — Those of the materials in the oxidation zone effluent which have boiling points less than that of the free glycol component of the product other than by-product water, carbon dioxide, etc. and also excluding unreacted olefin, carboxylic acid. Again, the nature of these components has not been fully elucidated but would include (assuming ethylene to have been the olefin, acetic acid to have been the carboxylic acid reactant and that bromine and/or a bromine compound had been employed as a catalyst component) such materials as bromohydrin; 2-bromoethyl acetate; 1,2-dibromoethane; 1,4-dioxane; and 1,3-dioxolane among others.

"Selectivity" or "selectivity to the desired glycol ester" — the ratio (often expressed as a percentage) of $$\frac{\text{moles of (glycol diester + glycol monoester + glycol) formed}}{\text{moles of olefin reacted}}$$

When vicinal glycol esters are formed by contact of an olefin, molecular oxygen and a carboxylic acid present in liquid reaction medium comprising the lower carboxylic acid and in the presence of a catalyst which consists essentially of (a) a variable valent metal cation and (b) an appropriate halogen source, I have found that significant quantities of a high-boiling residue are present in the liquid effluent from the oxidation reaction. My invention is based upon the discovery that, when this residue is separated from the liquid reaction effluent, it can be treated further to liberate additional glycol esters by intimately contacting it in the liquid phase with a carboxylic acid at temperatures within the range of those used in the oxidation.

In a preferred embodiment of my invention, the residue is separated from the oxidation zone effluent and substantially all of such residue is recycled directly to the oxidation zone. Therein, the residue is subjected to contact with the carboxylic acid-containing reaction medium whereby additional glycol esters are formed. By recycle of this high-boiling residue, the selectivity of the oxidation to the desired diester and its precursors, expressed on a molar basis, can be increased from about 70 to 80 percent as much as 90 percent or even more.

The precursor light components can also be treated in a carboxylic acid medium at temperatures within the range of those used in the oxidation to liberate and/or form additional product. In a preferred embodiment they also would be recycled directly to the oxidation zone where they are converted to additional quantities of the desired glycol ester. Under preferred oxidation conditions, these light components can upon the further acid treatment of my invention aid in increasing oxidation selectivities by as much as 7 percent on an overall molar basis.

In another embodiment of my invention, both the residue and the precursor light components are each reacted in the same carboxylic acid medium. In yet another and the most preferred embodiment of my invention, both residue and precursor light components are recycled to the oxidation zone to increase overall molar selectivity to the desired glycol ester.

The Olefin Reactant

The olefins useful in the process of the invention are more properly characterized as olefinically unsaturated compounds but are herein called olefins for convenience. Suitable olefins are the alkenes; cycloalkenes; aralkenes; 1,3-butadiene and specific substituted allyl compounds.

Suitable alkenes are the straight or branch chain hydrocarbons containing from two to six carbon atoms. The double bond in the alkene can be positioned at any one of the carbon atoms such as alpha, beta, gamma, and delta positions and the like. Thus suitable olefinic reactants include lower alkenes of from two to six carbon atoms such as ethylene, propylene, butene-1, butene-2, 2-methylbutene-2, pentene-1 and the like.

Suitable aralkene reactants are those having an aromatic nucleus (i.e., the phenyl nucleus) and an alkenyl side chain co-extensive in scope with the alkenes as described above (i.e., with a $C_2$–$C_6$ unsaturated side chain) attached to the phenyl nucleus. In addition to the alkenyl side chain, the nucleus can also contain one or two lower alkyl ($C_1$–$C_5$) substituents. For example, suitable aralkene reactants include styrene, alpha-metylstyrene, p-methylstyrene and 3,5-diethylstyrene.

The cycloalkenes of this invention are compounds containing from four to 12 nuclear carbon atoms and one double bond including, for example, materials such as cyclobutene, cyclopentene, cyclohexene, cyclodecene and cyclododecene.

An additional class of olefinic reactants suitable for use in the process of this invention are the substituted alpha-allyl compounds, specially the allyl halides (bromide, chloride or iodide), allyl alcohol and allyl esters of $C_1$–$C_5$ monobasic aliphatic carboxylic acids, e.g., allyl acetate.

In the more preferred aspects of this invention, the olefinic reactant is ethylene; propylene; allyl alcohol; 1,3-butadiene; allyl acetate; allyl chloride; butene-2; 2-methylbutene-2; styrene or cyclohexene while the use of ethylene, propylene and butene-2 as reactants is especially preferred.

The olefins contemplated for use in this invention can contain the variety of impurities normally associated with the commercially available materials. For example, the ethane present as an impurity in ethylene or the propane present as an impurity in propylene do not interfere with the reaction.

The Carboxylic Acid Reactant

The carboxylic acid employed in the oxidation supplies the acyl moiety to the glycol ester and is preferably a lower aliphatic monobasic acid of from one to six carbon atoms such as formic acid, acetic acid, propionic acid, butyric acid, isobutyric acid and the valeric and caproic acids. Benzoic acid and its ring-substituted derivatives can also be used. For example, aside from benzoic acid iteself, o-toluic, m-toluic, o-chlorobenzoic, m-chlorobenzoic, p-chlorobenzoic (or the brominated analogues of these materials), o-nitrobenzoic, m-nitrobenzoic, p-hydroxybenzoic acids can also be used. Formic acid, acetic acid and benzoic acid are preferred species and acetic acid is especially preferred.

The invention also contemplates the use of mixed carboxylic acid reactants in any desired ratio, although it is preferred to employ a single acid reactant whn one wishes to avoid obtaining mixed ester products. The carboxylic acid can be employed in any commercially available form including the use of aqueous solutions thereof. It is preferred, however, to employ commercial acids having no more than 25 percent water, and especially less than 15 percent water, such as 90–98 percent acetic acid. The acids used can suitably contain the various organic and inorganic impurities normally associated with the various commercially available materials and, for purpose of this invention, such impurities can be allowed to remain or can be removed as one desires.

Correspondingly, the preferred glycol esters to the production of which the process of this invention is applicable include ethylene glycol diacetate, 1,2-propylene glycol diacetate, the corresponding diformates and dibenzoates as well as the corresponding mono-esters.

The acids used in the acid treatment of the precursor light components and residue called for by this invention can be any of those indicated as suitable for use as a reactant and need not be the same acid employed during the oxidation, though of course, when the acid treatment is conducted within the oxidation zone, the acid treatment will inherently be accomplished with the same acids used as reactants.

The Catalyst

The process of this invention requires a catalyst system which consists essentially of a variable valent metal cation plus at least one of bromine, chlorine, a bromine-containing compound or a chlorine-containing compound. The variable valent metal cation can be utilized in its elemental form and added to the oxidation zone as a fine powder or can be added in any form which, in solution or suspension under oxidation conditions, will yield at least some soluble metal ions. For example, the metal source can be the carbonate, oxide, hydroxide, bromide, chloride, lower ($C_1$–$C_3$) alkoxide (e.g., the methoxide), phenoxide or metal carboxylates wherein the carboxylate ion is the same or different from the acid reactant. In a preferred aspect, the metal is added as the oxide, hydroxide, salt of the acid reactant or as the halide. Furthermore, the metal compound employed can contain impurities naturally associated with the commercially available compounds, and need not be purified any further.

The preferred systems employ at least one of tellurium, cerium, antimony, manganese, vanadium, gallium, arsenic, cobalt, copper, selenium or silver as the variable valence metal cations when using bromine or a bromine-containing compound, with tellurium, cerium, antimony, manganese or vanadium being the more desirable and tellurium, cerium, antimony, and manganese being most preferred. For use with chlorine or a chlorine-containing compound, the preferred catalyst contains cerium, manganese, arsenic, cobalt, copper, selenium or chromium; the more preferred being cerium, manganese, cobalt, copper and selenium with the most preferred being cerium, manganese and cobalt.

When it is desired to use a bromine or chlorine-containing compound in the reaction instead of bromine or chlorine itself, one can employ any compound capable upon oxidation of producing bromide or chloride ions in solution. For example, one can use hydrohalic acids (gaseous or aqueous, preferably concentrated aqueous acid) any metal halide such as the alkali, alkali earth or heavy metal bromides or chlorides, (potassium bromide, calcium chloride, manganese bromide and the like) the metal bromides or chlorides corresponding to the variable valence metal cations or organo-chlorine and organo-bromine compounds such as alkyl di-halides, lower aliphatic ($C_1$–$C_6$) halides (propylhalide, pentylhalide), cyclo lower aliphatic halides (cyclohexylhalide) or lower aliphatic dihalides, (ethylene dichloride, dibromoethylene) and all of the halogen-containing diester precursors, all of which are considered for nomenclature purposes to be compounds capable of producing bromide or chloride anions. Also contemplated is the use of a mixture of two or more halogen-producing compounds, containing the same or different halogen, as well as mixtures wherein the cation of the halide compound may be the same or different from the cation of the other metal compound employed. The halogen employed may suitably contain impurities therein, normally associated with the commercially available halogen and in the preferred aspect of this invention the commercially available materials are employed.

Of all the catalyst systems, that most preferably employed is a tellurium metal cation (supplied to the oxidation zone as the powdered metal, the oxide, the carbonate, the bromide or in any one or more of the forms referred to above but most preferably as the oxide) in conjunction with a non-basic bromine source. The use of this especially preferred catalyst system facilitates maintenance of the pH of the liquid phase reaction system at a level less than 2.0 which further enchances yield and selectivity. As here used and throughout this specification, references to Ph means the pH of a sample of the liquid phase reaction medium measured at 25°C. after dilution with 10 parts of water (weight basis) per part by weight of reaction medium. The pH is controlled by supplying sufficient bromine from a non-basic bromine source. Suitable non-basic bromine sources include any of those referred to above except the alkali and alkaline earth metal bromides. For example, the non-basic bromine source can be $Br_2$, hydrobromic acid, a tellurium bromide, an organic bromide, or a metal bromide where the metal cation is not an alkali or alkaline earth metal.

Among the organic bromine compounds which are suitable non-basic bromine sources are: bromoformyl bromide; acyl bromides wherein the acyl group is aliphatic (preferably $C_2$–$C_6$) or aromatic (preferably benzoyl), for example, acetyl bromide, propionyl bromide, benzoyl bromide, etc.; 1-phenyl-1-bromoethan-2-ol; 1- and 2-bromoalkanols, e.g., 2-bromoethanol, 2-bromopropan-1-ol, 1,bromoethan-1-ol, etc.; benzyl bromide and substituted benzyl bromides, e.g., alpha, alpha-dimethyl benzyl bromide and the ortho, meta and para methyl or ethyl benzyl bromides; tertiary alkyl bromides wherein the alkyl group has typically up to 8 or 9 carbon atoms, e.g., t-butyl bromide, 2-bromo-2-methylbutane, 4-bromo-2,2,4-trimethylpentane; alpha-allyl bromide and other allylic-type (i.e., containing $C_1$–$C_{12}$ alkyl substituents in the 3 position) bromides such as 1-bromo-4-methylpent-2-ene; carbon tetrabromide; lower ($C_1$–$C_6$) carboxylic acid esters of 2-bromoethanol, e.g., 2-bromoethyl formate and 2 bromoethyl acetate; vicinal alkylene dibromides having two to 10 carbon atoms, e.g., 1,2-dibromoethane, 1,2-dibromopropane, 1,2- and 2,3-dibromobutane; alkyl monobromides having two to 10 carbon atoms, especially those having two to six carbon atoms and preferably those wherein the bromine atom is bonded to a secondary rather than a primary carbon atom, e.g., 2-bromopropane, 2-bromo-3-methylbutane, 2-bromopentane; mono-, di- and tribromomethanes; brominated, lower aliphatic ($C_2$–$C_6$) carboxylic acids having at least one bromine atom bonded to the carbon atom alpha to the carboxyl radical e.g., bromoacetic acid, dibromoacetic acid and tribromoacetic acid; and, benzyl bromide and benzyl bromides having one or more lower alkyl ($C_1$–$C_3$) and/or hydroxy ring substituents, e.g., m-bromophenol or p-bromotoluene.

Especially suitable organo bromine compounds include all those bromine compounds of the foregoing types which have the same carbon skeleton as the olefinically unsaturated compound being oxidized (whether or not such compounds are actually formed in the oxidation) and the reaction products. For example, in the oxidation of ethylene these include but are not limited to 1,2-dibromoethane, bromoethane, ethylidene dibromide, ethylene bromohydrin, 2-bromoethyl carboxylate and other bromine-containing derivatives of ethylene and including higher molecular weight ethers (e.g., brominated diethylene and triethylene glycols) and the like. Similarly, in the oxidation of propylene, the organic bromides include 1,2-dibromopropane, propylene bromohydrin, 2-bromopropyl carboxylate and other bromine-containing derivatives of propylene and including higher molecular weight ethers and the like.

Reaction Conditions

The various reactants employed in the oxidation reaction can be effectively used over a wide range of concentrations. Catalyst concentration can also vary widely, depending upon temperature, residence time and the type of halogen. Effective amounts of catalyst, expressed in weight percent of bromide or chloride to total liquid phase reaction medium can be from 0.01 percent to 30 percent or higher, but preferably from 0.1 percent to about 20 percent and especially from about 0.5 percent to about 10 percent. The concentration of total operable metal cation present, expressed in terms of equivalents of cation/equivalents of halogen expressed as bromine or chlorine, can vary from about 1:.01 to about 1:100 but preferably from about 1:0.2 to about 1:40 and especially from about 1:1 to about 1:20.

The mole ratio of oxygen to olefin in the feed is not critical and, therefore, any suitable mole ratio such as 1:100 to 1:.001 may be used; provided, of course, that the mixture used is not in the explosive region. The source of the oxygen can be high-purity oxygen, or a mixture of oxygen and an inert gas such as found in air, or it can in fact be air.

The temperatures maintained in the oxidation zone can vary from about 50°C. to the bubble point of the liquid phase reaction mixture within the zone but generally will be between about 50°C. and about 200°C., desirably between about 90°C. to about 180°C. It will be understood that the acid treatment called for by the process of this invention is carried out at temperatures within the same ranges as are employed in the oxidation although the acid treatment need not be conducted at temperatures identical with that employed in any given oxidation.

Any pressure sufficient to maintain a liquid phase within the oxidation zone can be employed. Generally pressures from about atmospheric or below to about 1,000 p.s.i.a. and preferably from about 25 p.s.i.a. to about 1,000 p.s.i.a. would be used. Preferably, however, for the oxidation of lower olefins such as ethylene and propylene the total pressure of the oxidation zone would be maintained at from about 50 to about 1,000 p.s.i.a., and most preferably about 200 to about 500 p.s.i.a. For the higher olefins, the pressure would be from about 25 to about 500 p.s.i.a.

The acid treatment likewise requires a liquid phase and pressures similar to those used in the oxidation reaction can be employed.

The time of reaction depends to a great extent upon the concentration of reactants and therefore, may suitably vary over a wide range. Flow rates are preferably adjusted so that the rate of formation of product as glycol diester is from about 0.10 to 10.0 gram-moles per liter of liquid phase reaction medium per hour. Once steady state conditions are obtained, the reaction can be continued with anywhere from about 5 to about 60 percent by weight of glycol ester products remaining in the liquid phase reaction medium, but this concentration is preferably maintained at from about 15 to about 50 percent by weight, based on the total weight of the liquid.

If desired, the reaction can be carried out in the presence of an inert solvent. Examples of such inert solvents are benzene, t-butylbenzene, t-butanol or ethylene glycol diacetates, etc. Preferably, however, the carboxylic acid reactant necessarily present in the liquid phase reaction medium is used as a solvent as well as the source of the acid moiety of the desired ester.

During the oxidation, a liquid product stream is continuously withdrawn from the oxidation zone. This stream contains, aside from the desired product, precursor light components, and residue in addition to carboxylic acid, water, dissolved and suspended catalyst. This stream is subjected to a distillation to separate the high boiling materials from the remainder of the stream. This first distillation can be a flash distillation or a conventional distillation. If a flash distillation technique is employed, it desirably is carried out at from about 0.01 mm Hg and 50°C. to about 760 mm Hg and 220°C., but preferably from about 1 mm Hg and 100°C. to about 300 mm Hg and 170°C. The residue is then subjected to the carboxylic acid treatment described above.

The overhead or lighter fraction of the first distillation is subjected to a second stage distillation whereby product glycol and precursors are separated from the lower boiling compounds which include the precursor light components. During this distillation the glycol monoesters and glycols are in part esterified to the glycol diester. The product diester is then collected and treated as desired. The precursor light components are also separated and subjected to the acid treatment described above.

In the preferred operation of my invention either the residue stream or the precursor light components or preferably both the residue stream and the precursor light components are subjected to the acid treatment after their separation from the glycol ester product. Preferably, the acid treatment is performed in the oxidation zone. In the most preferred embodiment of the invention both precursor light components and residue, once separated from the oxidation effluent are recycled to the oxidation zone.

The following examples which are hereinafter submitted are intended for purposes of illustration of my invention and are not intended to be limitations on the scope of my invention. All percentages given are by weight unless otherwise specified.

Control

This experiment provides a basis against which the advantages of this invention can be assessed and is not illustrative of the invention.

Into a 1.5-liter stirred titanium autoclave equipped with liquid and vapor inlet and outlet conduits and a liquid overflow at 1 liter of volume is charged 600 grams of acetic acid, 14 grams tellurium dioxide, 26 grams of 48 percent hydrobromic acid and 28 grams 2-bromoethyl acetate. The autoclave is gradually heated to 160°C. and 334 grams per hour of a liquid mixture of the following composition is pumped into the reactor: 89.8 percent acetic acid, 2.1 percent tellurium dioxide, 3.9 percent of 48 percent hydrobromic acid and 4.2 percent 2-bromoethyl acetate. The reaction zone is maintained at 400 p.s.i.g. with an ethylene flow rate of 500 liters (measured at 0°C. and 760 mm Hg) per hour and an oxygen flow rate of 50 liters (measured at 0°C. and 760 mm Hg) per hour. Steady state operation is achieved after about 12 hours. An overflow rate of 442 grams per hour of effluent is collected which is found to contain ethylene glycol diacetate, ethylene glycol monoacetate and ethylene glycol in the following percentages: 27.9 percent diacetate, 16.5 percent monoacetate, 2.1 percent ethylene glycol. The balance of the effluent predominately contains precursor light components, the residue and unreacted acetic acid.

2,000 grams of this effluent is subjected to a flash distillation performed at 1 mm Hg and 100°C. to leave behind the residue. The residue weighs 250.1 grams and contains about 1.4 percent weight percent ethylene glycol diacetate and the carbon content is 31.9 percent. The volatiles are subjected to a careful distillation wherein the monoacetate and ethylene glycol are partially esterified to the diester. About 1125 grams of ethylene glycol diacetate is collected at 124 to 126°C. and 90 mm Hg. The selectivity lost to residue is calculated at 29.8 percent based on the ethylene reacted.

Example I

This example illustrates operation of the invention wherein the residue is treated in a carboxylic acid medium.

The procedures for the oxidation of ethylene and the distillations of the effluent of the Control are followed. 100 grams of the residue containing 0.9 percent ethylene glycol diacetate and 0.36 percent ethylene glycol monoacetate is contacted with 500 grams of 95 percent acid and 5 percent water and allowed to react at 160°C. for about 2 hours under 200 p.s.i.g. of nitrogen. After the reaction is stopped there is 10.2 percent glycol diacetate and 3.9 percent ethylene glycol monoacetate and about 0.7 percent ethylene glycol.

Example II

This example illustrates treatment of the effluent residue by recycle to the oxidation zone and recycle of the precursor light components.

The procedures of the Control are followed and after the effluent from the autoclave is flashed as in Example I, there remains about 12.5 weight percent residue. The volatiles from the flash distillation are further distilled to give the following cuts:

| | Boiling Point °C. | Weight % |
|---|---|---|
| Cut 1 | 87 – 98 | 0.4 |
| Cut 2 | 98 – 100 | 7.0 |
| Cut 3 | { 101 – 117 <br> 60° – 124 (90 mm Hg) } | 23.9 |
| Cut 4 | 124 – 126 (90 mm Hg) | 56.2 |

Cuts 1 and 3, comprising the precursor light materials and acetic acid, along with residue, make-up acetic acid and small amounts of hydrobromic acid are combined and fed to the oxidizer at a rate of 334 grams per hour while the oxidizer is maintained at 160°C. and 400 p.s.i.g. with an ethylene flow of 500 liters (standard conditions) per hour and an oxygen flow rate of 50 liters standard conditions) per hour.

An effluent containing 56.1 percent ethylene oxidation products expressed as ethylene glycol diacetate is withdrawn from the oxidizer. This effluent is flashed to yield about 12.5 percent residue and the volatiles are distilled as above. After a total of seven recycles the oxidizer effluent contained 56.0 percent products expressed as ethylene glycol diacetate and had a residue content of about 12.7 percent based on the final effluent. Based on the total product made, the carbon content of this residue represents a loss of only 3.4 percent selectivity in contrast to the 29.8 percent selectivity loss in the control.

Example III

The oxidizer of the Control is charged with 600 grams acetic acid, 14 grams tellurium dioxide, 26 grams of 48 percent hydrobromic acid and 28 grams 2-bromoethyl acetate. The oxidizer is gradually heated at 160°C. and maintained at 400 p.s.i.g. with an ethylene flow of 500 liters (standard conditions) and an oxygen flow of 50 liters (standard conditions) per hour, while introducing a liquid mixture of the following composition: 89.9 percent acetic acid, 2.1 percent tellurium dioxide, 3.9 percent of 49 percent hydrobromic acid and 4.2 percent 2-bromoethyl acetate at a rate of 750 grams per hour.

Steady state conditions are achieved after about 7 hours of operation. Effluent is withdrawn from the oxidizer at a rate of about 842 grams per hour and is found to contain 21.2 percent ethylene glycol diacetate, 8.7 percent ethylene glycol monoacetate and 0.4 ethylene glycol (34.1 percent expressed as ethylene glycol diacetate).

A 200 gram sample of this effluent is subjected to a flash distillation at 1 mm Hg pressure up to a maximum pot temperature of 100°C. to leave behind 61.4 grams of residue. The residue contains 30.7 percent carbon and 0.8 percent ethylene glycol diacetate and 0.32 percent ethylene glycol monoacetate. Based on the ethylene reacted, the selectivity loss to residue is 14.1 percent.

The volatiles of the flash distillation are distilled as described in Example I. Cuts 1, 3, residue, make-up acetic acid and a small amount of hydrobromic acid are combined and fed to the oxidizer at 750 grams per hour while maintained at 160°C. and 400 p.s.i.g. with an ethylene flow of 500 liters (measured at 0°C. and 760 mm Hg) per hour and an oxygen flow of 50 liters (measured at 0°C. and 760 mm Hg) per hour.

After seven recycles the reactor effluent contained 33.9 percent product expressed as ethylene glycol diacetate and a residue content of 3.1 percent based on the final effluent. Based on the total product make and the carbon content of the residue, a selectivity loss of only 1.9 percent is encountered.

Example IV 25 grams of residue of Example III is contacted with 125 grams of a 95 percent solution of acetic acid and 5 percent water and allowed to react at 160°C. for 2 hours under 200 p.s.i.g. of nitrogen. The mixture is found to contain 10.5 percent ethylene glycol diacetate, 3.7 percent ethylene glycol monoacetate and 0.5 percent ethylene glycol.

Example V

This example illustrates the treatment of the precursor light components of Example III by contacting them with a carboxylic acid medium at an elevated temperature.

Cuts 1, 2 and 3 from the distillation of Example IV are combined and analyzed. The mixture is found to contain 0.7 percent ethylene glycol diacetate, 0.2 percent ethylene glycol monoacetate with the remainder primarily acetic acid, water and precursor light components (including such materials as 2- bromoethyl acetate; 1,2 dibromo ethane; ethylene bromohydrin and the like).

100 grams of the mixture is heatd to 160°C. for 2 hours under a nitrogen atmosphere of 200 p.s.i.g. After this time there is found 4.8 percent ethylene glycol diacetate and 1.4 percent ethylene glycol monoacetate.

What is claimed is:

1. In the process for the preparation of vicinal glycol esters by the reaction of an olefin, molecular oxygen and a carboxylic acid, said reaction being carried out in the liquid phase within an oxidation zone in the presence of a catalyst consisting essentially of (a) a variable valence metal cation slected from the group consisting of tellurium, cerium, antimony, vanadium, gallium, arsenic, copper, selenium and silver and (b) at least one of bromine, chlorine, a bromine-containing compound capable upon oxidation of yielding bromide ions in solution, or a chlorine-containing compound capable upon oxidation of yielding chloride ions in solution, the improvement which comprises: continuously removing a liquid effluent from said oxidation zone; fractionating said effluent to obtain a residue having a boiling point higher than that of said vicinal glycol ester; contacting said residue with a liquid medium comprising a carboxylic acid whereby additional glycol ester is obtained.

2. The process of claim 1 wherein the carboxylic acid medium is the same carboxylic acid as used in the oxidation zone.

3. The process of claim 1 wherein said residue is contacted with said carboxylic acid medium by recycling said residue to said oxidation zone.

4. In the process for the preparation of vicinal glycol esters by the reaction of an olefin, molecular oxygen and a carboxylic acid, said reaction being carried out in the liquid phase within an oxidation zone in the presence of catalyst consisting essentially of (a) a variable valence metal cation selected from the group consisting of tellurium, cerium, antimony, vanadium, gallium, arsenic, copper, selenium and silver and (b) at least one of bromine, chlorine, a bromine-containing compound capable upon oxidation of yielding bromide ions in solution, or a chlorine-containing compound capable upon oxidation of yielding chloride ions in solution, the improvement which comprises: continuously removing a liquid effluent from said oxidation zone; separating said effluent to obtain a residue having a boiling point higher than that of said vicinal glycol ester; separating from said effluent unreacted carboxylic acid contained in said effluent; recovering glycol ester product from said effluent; separating from said effluent a stream comprising precursor light components contained in said effluent; contacting said residue with a liquid medium comprising a caroboxylic acid whereby additional glycol ester is obtained.

5. The process of claim 4 wherein said carboxylic acid medium contains the same carboxylic acid as used in the oxidation zone.

6. The process of claim 4 wherein in addition to said residue, the precursor light components are also contacted with said carboxylic acid medium.

7. The process of claim 4 wherein said carboxylic acid medium is maintained at from about 90°C. to about 180°C.

8. The process of claim 4 wherein the carboxylic acid is a lower carboxylic acid of from two to six carbon atoms.

9. The process of claim 8 wherein the olefin is a lower olefin of from two to five carbon atoms.

10. The process of claim 8 wherein said olefin is ethylene.

11. The process of claim 8 wherein said olefin is propylene.

12. A process in accordance with claim 6 wherein both said residue and said precursor light components are recycled to said oxidation zone to effect said contact.

13. A process in accordance with claim 4 wherein the catalyst is tellurium cation and at least one of bromine and a bromine-containing compound capable upon oxidation of yielding bromine ions in solution.

* * * * *

UNITED STATES PATENT OFFICE
CERTIFICATE OF CORRECTION

Patent No. 3,789,065          Dated January 29, 1974

Inventor(s) John Kollar

It is certified that error appears in the above-identified patent and that said Letters Patent are hereby corrected as shown below:

Column 1, line 14, "Sept. 16" should read -- Sept. 26 --; line 31, Mar. 14" should read -- Mar. 24 --; line 53, "residue" should read -- "residue" --. Column 2, line 22, "termperature" should read -- temperature --. Column 3, line 11, "Residue" should read -- "Residue" --; line 15, "residue" should read -- "residue" --; line 24, "Precursor Light Components" should read -- "Precursor Light Components" --. Column 4, line 1, "percent as much" should read -- percent to as much --; line 54, "specially" should read -- specifically --. Column 5, line 11, "iteself" should read -- itself --; line 20, "whn" should read -- when --. Column 6, line 54, "Ph" should read -- pH --. Column 7, line 21, "having two" should read -- having from two --. Column 8, line 61, "high" should read -- higher --. Column 10, lines 8 and 9, "percent acid" should read -- percent acetic acid --; line 11, "10.2 percent glycol" should read -- 10.2 percent ethylene glycol --; line 39, "standard conditions)" should read -- (standard conditions) --; line 57, "at 160°C." should read -- to 160°C. --; line 61, "89.9 percent" should read -- 89.8 percent --. Column 11, line 59, "slected" should read -- selected --. Column 12, line 18, "of catalyst" should read -- of a catalyst --.

Signed and sealed this 20th day of August 1974.

(SEAL)
Attest:

McCOY M. GIBSON, JR.          C. MARSHALL DANN
Attesting Officer          Commissioner of Patents